April 29, 1941.  R. C. BRATT  2,239,838

LIGHTING SYSTEM FOR AUTOMOBILES

Filed Feb. 7, 1940

INVENTOR
*Robert C. Bratt*
BY *Evans & McCoy*
ATTORNEYS

Patented Apr. 29, 1941

2,239,838

UNITED STATES PATENT OFFICE 2,239,838

LIGHTING SYSTEM FOR AUTOMOBILES

Robert C. Bratt, Cleveland, Ohio

Application February 7, 1940, Serial No. 317,784

3 Claims. (Cl. 171—97)

This invention relates to electric lighting circuits for automobiles, and more particularly to an automatic safety device for automobiles.

It is an object of this invention to provide a system whereby both head lamps of an automobile will function even though one filament is burned out.

Another object of this invention is to provide a lighting system which, when either filament in one or both of the double filament head lamp bulbs burn out or otherwise fails, will automatically substitute the remaining filament in said bulb and also, at the same time, signal the operator that a filament has failed to light.

Many circuits have heretofore been proposed for automatically lighting either one or both of the dim lights of automobile head lamps when a bright light filament burns out, and for either lighting one or both of the bright lights when a dim light filament burns out, or for signaling the operator of the light failure. However, these systems have either been so complicated as to become impractical or expensive, or they have been undesirable in that two filaments are substituted when only one filament fails.

It is, therefore, another object of this invention to provide a simplified lighting system which operates to turn on but one filament at the proper location when a filament failure occurs, and which signals the operator of such failure.

A further object of this invention is to provide a compact unit which can be readily installed in an automobile which has but one relay for each filament under consideration, and which signals the operator of any failure of said filaments.

Other objects will be apparent from the following detailed description of the appended drawing, where—

Figure 1:
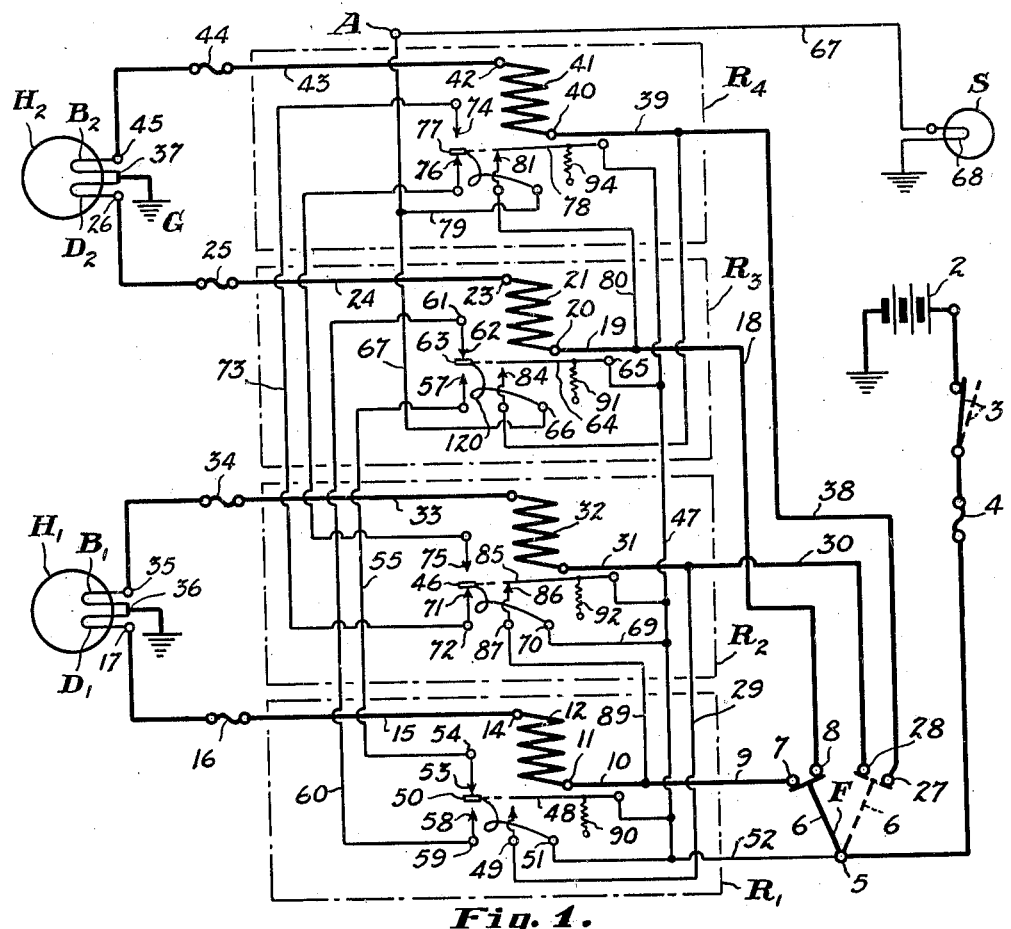
Figure 2:
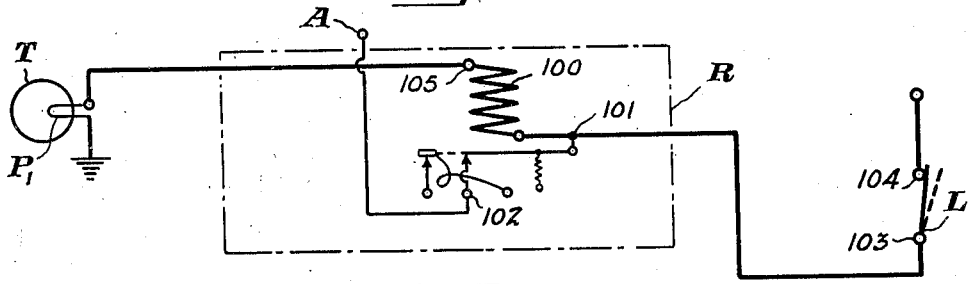

Figure 1 is a diagram of an automobile lighting circuit embodying the present invention; and Fig. 2 is a circuit diagram showing the manner of connecting an additional relay for indicating a failure of any other light, such as a tail light or parking light.

Referring more particularly to Fig. 1, $H_1$ and $H_2$ designate head lamps of an automobile having bright filaments $B_1$ and $B_2$, and dim filaments $D_1$ and $D_2$, respectively, and $R_1$, $R_2$, $R_3$ and $R_4$ each designate relays. Filaments $D_1$ and $D_2$ are located above the respective filaments $B_1$ and $B_2$ in order to direct the light downward. S indicates a signal light with a single filament. One terminal of a battery 2 is shown connected to a ground G, and the other terminal is connected through a light switch 3 and main light fuse 4 to a pole 5 of a suitable dimmer switch, which may be a foot switch F having an arm 6, which is shown in a position so that connection is made between the contact 5 and contacts 7 and 8 for operation of the dimmer filaments $D_1$ and $D_2$. The contact point 7 is connected by means of the wires 9 and 10 to a terminal 11 of solenoid 12 in the relay $R_1$. The other terminal 14 of the coil 12 is connected by means of a wire 15 through fuse 16 to a terminal 17 of the filament $D_1$. Terminal 8 of the switch F, which when the switch is in the full line position shown is also connected to the contact 5, is connected through a wire 18 and branch wire 19 to a terminal 20 of the relay coil or solenoid coil 21. The other terminal 23 of the coil 21 is connected through a wire 24 and a fuse 25 to the terminal 26 of the filament $D^2$. When the switch F is moved to the dotted position so that connection is made between the switch arm 6 and the terminals 27 and 28, these terminals then make electrical connection with terminal 5.

One of the contacts 28 is connected by means of the wire 30 and branch wire 31 to a terminal of the coil 32 of the relay $R_2$. The other terminal of the solenoid coil 32 is connected through the wire 33 and fuse 34 to the terminal 35 of the filament $B_1$. Common terminals 36 and 37 of the two filaments in each light are connected to the ground G. The other contact 27 of the switch F is connected through the wire 38 and the branch wire 39 to the terminal 40 of the relay coil or solenoid coil 41 in the relay $R_4$. Terminal 42 is connected through the wire 43 and fuse 44 to the terminal 45 of the filament $B_2$.

Terminal 7 of the switch F is also connected through the wire 9 and the branch wire 89 to the terminal 87 connected to the contact point 86 of the relay $R_2$. The armature 85 of the relay $R_2$ carrying contact 46 is adapted to break the connection between the terminal 87 and the wire 47 when the coil 32 is energized. Similarly, the armature 48 of the relay $R_1$ is adapted to make and break the circuit between the wire 47 and the wire 30, (the wire 30 being connected to the contact 49 by the branch wire 29), as the coil 12 of the relay $R_1$ is de-energized and energized, respectively. The contact 50 which is carried by and insulated from the armature 48 is connected to the terminal 51, which in turn is connected both to the wire 47 and the terminal 5 of the switch F by means of the wire 52. When the coil 12 is energized, the contact 50 makes connection with contact 53 connected to the terminal 54, which is in turn connected by means of the wire 55 to the contact 57 of relay R3, and when the relay coil 12 is de-energized, the contact 59 makes connection with the contact 58 which is connected through terminal 59 and the wire 60 and terminal 61 to the contact 62 of relay R3. The movable contact 63, carried by and insulated from the armature 64 which is connected through the terminal 65 to the wire 47, makes connection through the loop 120 and the terminal 66 and wire 67 with the filament 68 of the signal lamp S, which is connected in series with the wire 67 and the ground G. The wire 47 is also connected through the wire 68 and terminal 79 to the movable contact 46, which makes connection through the contact 71, terminal 72 and wire 73 with the contact 74 of the relay R4 as the coil 32 is de-energized, and makes connection with the contact 75, which is connected to the contact 76 of the relay R4 as the coil 32 is energized. The movable contact 77, carried by and insulated from the armature 78, is connected to the wire 67 through the wire 79. The wire 18 is connected by the wire 80 to the contact 81, which makes connection through the armature 78 with the wire 47 when the coil 41 of the relay R4 is de-energized.

In the operation of the apparatus, as shown in Fig. 4, with the switch F arranged to connect contacts 7 and 8 with terminal 5, part of the current from the battery flows through each of the coils 12 and 21 of the relays R1 and R3 to each of the filaments D1 and D2, causing them to glow. The current through the coils 12 and 21 causes the armatures 48 and 64 to be moved against the force of the tension springs 90 and 91 so that connections between contact 49 and armature 48, and between contact 84 and armature 64 are broken. At the same time, connection is made between terminals 51 and 53, and between 66 and 62.

If, for example, filament D1 should fail or a short should occur, blowing line fuse 16, coil 12 of relay R1 would be de-energized, allowing the armature 48 to be withdrawn by spring 90 so that connection is made between the contact 49 and the wire 47. This permits current to pass from the wire 47 through the armature 48, the contact 49, the wires 29 and 31, the coil 32 of the relay R2, the wire 33 and the fuse 34, to the filament B1, causing it to light so that a light is maintained in each of the lights H1 and H2. Current then passing through the coil 32 moves the armature 85 against the force of the tension spring 92 so that connection between terminal 86 and the armature 85 is broken and connection is made between terminal 70 and contact 75. This last connection permits current to flow from the battery through wire 52, terminals 51, 53 and 59, through wire 60, terminals 61, 62 and 66, and thence through wire 67 to filament 68 of the signal light S, causing it to light, and signaling the operator that the current through filament D1 has failed.

If the filament D2 should fail instead of the filament D1, the coil 21 of the relay R3 would be de-energized, allowing the armature 64 to be moved by the tension of the spring 91 into contact with contact 84 so that current would flow from the wire 47 through the armature 64, the terminal 84 and the wire 39, through the coil 41 of relay R4, and through the wire 43 and the fuse 44 to the filament B2. At the same time, armature 78 is drawn to its upper position (looking at Fig. 1) and the movable contact 77 is connected to the terminal 74, allowing current to pass from the wire 47, along the wire 69, through points 70, 46, 71 and 72, along the wire 73, through points 74 and 77, and through the wires 79 and 67 to light the filament 68 of the signal lamp S, which would inform the operator of the car that one of the filaments, such as D2, has failed to light.

When the switch F is moved so that connection is made between terminal 5 and contacts 27 and 28, coils 12 and 21 of relays R1 and R3 are de-energized, allowing the armatures 48 and 64 to be moved by action of the springs 90 and 91 so that connection is made between terminal 65 and the contact 84, and between armature 48 and terminal 49. At the same time, current passes between the terminal 5 and terminals 27 and 28, along the wires 30, 31 and 38, 39, through the coils 32 and 41, through the wires 33 and 43 and the fuses 34 and 44 to light the filaments B1 and B2. Current through the coils 32 and 41 moves the armatures 85 and 78 against the tension of springs 92 and 94 so that electrical connection between armature 78 and contact 81, and between armature 85 and contact 86 is broken, and connection is made between terminal 70 and contact 75, and between the wire 79 and contact 74.

If current should stop flowing through the filament B1, the coil 32 would be de-energized and permit the spring 92 to withdraw the armature so that connection would be made between the wire 47 and the terminal 86 through the armature. This would allow current to be withdrawn from the wire 47 through the armature 85 and pass through the wire 89, which is in electrical connection with the filament D1, thus causing the filament D1 to light. At the same time, connection is made between the contacts 46 and 71, which permits current to pass along the wire 69 to the wire 73 and through points 74, 77 and 73, and the wire 79, and along wire 67 to light the filament 68 of the signal light S, thus indicating a burned out filament.

If the filament B2 should fail, or if the circuit through that filament should be broken, coil 41 of the relay R4 would be de-energized and the armature 78 would be moved by the spring 94 into connection with contact 81. Current would then be passed from wire 47 through the armature and contact 81, along wires 80 and 19, through the coil 21 to light filament D2. At the same time, current would pass from the wire 69, between terminal 70 and contact 75, then through the connection between contacts 76 and 77, along wires 79 and 67 to light the filament 68 of the signal light S to signal the operator that a filament has failed to light.

If it should also be desired to indicate the failure of other lights, as for example a tail light or parking light T having a filament P1 as illustrated in Fig. 2, a relay, as above described, should be connected into the light circuit with the coil 100 in series with the filament. Then terminal 101 may be connected to the terminal 103 of the light switch L, which has terminal 104 suitably connected to the battery 2, and terminal 105 may be connected to the ungrounded terminal of filament P1. Terminal 102 is connected to the ungrounded terminal of the filament 68 of the signal light S at a suitable point A, which may be located on the wire 67, as shown in Fig. 1. A relay may similarly be connected into the circuit of each light where indication of failure is desirable. Should the current through the filament P1 be interrupted between the terminal 101 and the ground, current will flow between terminals 101 and 102, and thence to A on wire 67 and along the wire 67 to light the signal lamp.

One of the advantages of this invention is realized from the fact that I use but one relay or solenoid coil per head light filament and yet obtain both a substitution of the appropriate dim light for a bright filament should the latter fail to light, and a substitution of the appropriate bright light filament when a dim light fails. In addition, a single signal light is lighted when any of the filaments fail to light.

Furthermore, it is to be understood that the particular form of apparatus, shown and described, is presented for purposes of explanation and illustration, and that various modifications of said apparatus can be made without departing from my invention as defined in the appended claims.

What I claim is:

1. An electrical lighting system for automobiles comprising two head lamps with at least a dim filament and a bright filament each, a light switch, a source of electrical energy, only two separate relays for each of said head lamps, each relay having a single solenoid operating coil, which is connected in series with only one of said filaments, and normally closed main contacts, and a manually operable selector switch for selectively connecting said bright filament or the dim filaments and the respective operating coils in series therewith to said source of energy, one terminal of the operating coil of each relay being permanently connected to a terminal of said selector switch, the other terminal being permanently connected to a single filament, one of said main contacts of each relay being movable and being connected through said light switch to said source of energy regardless of the position of said selector switch, the other of said main contacts of each relay being stationary and being electrically connected to the operating coil of the other relay for the same lamp, said main contacts of each relay being opened by the operating coil only when lighting current passes therethrough, any relay having a coil in series with a manually connected filament being automatically operable by a failure of current flow through said manually connected filament to divert the current to a manually unconnected filament of said lamp without affecting the connection of the other head lamp.

2. An electrical lighting system for automobiles comprising two head lamps with at least a dim filament and a bright filament each, a light switch, a source of electrical energy, an auxiliary light, a signal light, two separate relays for each of said head lamps, each relay for said head lamps having only one solenoid operating coil, which is connected in series with only one of said filaments, normally closed main contacts and auxiliary contacts, a single relay having a coil in series with said auxiliary light and having normally closed auxiliary contacts, and a manually operable selector switch for selectively connecting said bright filament or said dim filament and the respective operating coils in series therewith to said source of energy, one terminal of each of said operating coils being permanently connected to a terminal of said selector switch and one terminal being permanently connected to only one of said filaments, one of said main contacts of each head lamp relay being movable and being connected through said light switch to said source of energy regardless of the position of said selector switch, the other of said main contacts in each relay being permanently electrically connected to the operating coil of the other relay for the same head lamp, any head lamp relay having a coil in series with any manually connected filament being automatically operable by a failure of current flow through said manually connected filament to close said main contacts and to divert the current to a manually unconnected filament of the same lamp without affecting the connection to the filament of the other head lamp, said auxiliary contacts being connected in a signalling circuit having only one signal light and being operated by a failure of current to flow through a manually connected filament so as to connect said signal light to said source of energy.

3. An electrical lighting system for automobiles comprising two head lamps with at least a dim filament and a bright filament each, a light switch, a source of electrical energy, a signal light, only two separate relays for each of said head lamps, each relay having only one solenoid operating coil, which is connected in series with only one of said filaments, normally closed main contacts and auxiliary contacts, and a manually operable selector switch for selectively connecting said bright filament or said dim filament and the respective operating coils in series therewith to said source of energy, one terminal of each operating coil being permanently connected to a terminal of said selector switch and one terminal being connected to only one of said filaments, one of said main contacts of each relay being connected through said light switch to said source of energy regardless of the position of said selector switch, the other of said main contacts in each relay being electrically connected to the operating coil of the other relay for the same lamp, any relay having a coil in series with a manually connected head lamp filament being automatically operable by failure of current flow through said manually connected filament to divert the current to a manually unconnected filament of the same lamp without affecting the connection of said other head lamp, said auxiliary contacts of each relay being connected in a signal circuit having only one signal light, the auxiliary contacts of the relays of a lamp having a failure of energy flow through any manually connected filament being adapted to be operated by such failure to connect said signal light to said source of energy.

ROBERT C. BRATT.